(12) United States Patent
Watanabe

(10) Patent No.: US 6,484,252 B1
(45) Date of Patent: Nov. 19, 2002

(54) MICROPROCESSOR WITH IMPROVED INSTRUCTION CYCLE USING TIME-COMPRESSED FETCHING

(75) Inventor: Nobuhisa Watanabe, Kanagawa-ken (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 08/488,082

(22) Filed: Jun. 7, 1995

Related U.S. Application Data

(63) Continuation of application No. 08/082,822, filed on Jun. 28, 1993, now Pat. No. 5,630,085, which is a continuation of application No. 07/810,532, filed on Dec. 19, 1991, now abandoned, which is a continuation of application No. 07/465,613, filed on Jan. 19, 1990, now abandoned, which is a continuation of application No. 07/368,942, filed on Jun. 13, 1989, now abandoned, which is a continuation of application No. 07/251,039, filed on Sep. 23, 1988, now abandoned, which is a continuation of application No. 06/810,357, filed on Dec. 18, 1985, now abandoned.

(30) Foreign Application Priority Data

Dec. 29, 1994 (JP) .......................................... 59-276835

(51) Int. Cl.⁷ .............................. G06F 9/30; G06F 9/40
(52) U.S. Cl. ........................ 712/207; 712/200; 712/208
(58) Field of Search ................................ 395/200, 800, 395/375; 712/200, 207, 208

(56) References Cited

U.S. PATENT DOCUMENTS

| | | | | |
|---|---|---|---|---|
| 3,609,700 A | * | 9/1971 | Wollum et al. | 395/375 |
| 3,793,631 A | * | 2/1974 | Silverstein et al. | 395/375 |
| 4,079,455 A | * | 3/1978 | Ozga | 395/800 |
| 4,346,437 A | * | 8/1982 | Blahut et al. | 395/375 |
| 4,541,045 A | * | 9/1985 | Kromer, III | 395/375 |
| 4,742,451 A | * | 5/1988 | Bruckert et al. | 395/375 |

FOREIGN PATENT DOCUMENTS

| | | | |
|---|---|---|---|
| GB | 2047928 | * | 12/1980 |
| GB | 2115964 | * | 9/1983 |

\* cited by examiner

Primary Examiner—Saleh Najjar
(74) Attorney, Agent, or Firm—Rader, Fishman, & Grauer PLLC; Ronald P. Kananen, Esq.

(57) ABSTRACT

A microcomputer includes an instruction decoder and a program counter. The instruction decoder decodes fetched instructions and outputs a control signal ordering execution of the fetched instruction. The control signal from the instruction decoder includes a component controlling fetch cycles which triggers a fetch cycle at the beginning of each instruction cycle to fetch the operand for the instruction currently being executed and midway through each instruction cycle to fetch the OP code for the next instruction. The program counter is responsive to the triggering of each fetch cycle to increment its counter value so as to keep the counter value consistent with the address being accessed in each fetch cycle.

6 Claims, 4 Drawing Sheets

MICROPROCESSOR WITH IMPROVED INSTRUCTION CYCLE USING TIME-COMPRESSED FETCHING

This application is a continuation of application Ser. No. 8/082,822 filed on Jun. 28, 1993, now abandoned, which is a 5,630,085 continuation of Ser. No. 07/810,532 filed Dec. 19, 1991, now abandoned which was a continuation of Ser. No. 07/465,613 filed Jan. 19, 1990, now abandoned which was a continuation of Ser. No. 07/368,942 filed Jun. 13, 1989, now abandoned, which was a continuation of Ser. No. 07/251,039 filed Sep. 23, 1988, now abandoned, which was a continuation of Ser. No. 06/810,357 filed Dec. 18, 1985, now abandoned.

BACKGROUND OF THE INVENTION

The present invention relates generally to a microcomputer. More specifically, the invention relates to an improved instruction cycle in a microcomputer which may help speed up microcomputer processing.

Modern monolithic microcomputers often employ a pipe-lined architecture which allow fetch cycles and instruction execution cycles to overlap. In the fetch cycle, instructions are fetched from memory. Each instruction consists of an operation code (OP code) which is stored in read-only-memory, such as programmable read-only-memory (PROM), and an operand, also stored in ROM, which may point to a variable value stored in random-access memory (RAM). In conventional pipe-line architectures, the OP code fetch and the operand fetch are performed in different instruction execution cycles, hereafter referred to as "instruction cycles". For example, in order to fetch a 2-byte instruction including a 1-byte OP code and a 1-byte operand in a 4-bit microcomputer, 2 instruction cycles are required. Therefore, in this case, each instruction cycle takes three machine clock cycles. This conventional pipe-line architecture is not satisfactorily efficient.

SUMMARY OF THE INVENTION

In general, the fetch cycle for fetching OP codes or operands is shorter than the instruction cycle. This means that there is a period in the execution cycle during which no fetching is being performed. If the next instruction component can be fetched during this period, run-time can be shortened.

Therefore, it is an object of the present invention to provide a microcomputer with an improved fetch cycle for shortening the instruction cycle.

In order to accomplish the aforementioned and other objects, a microcomputer, according to the present invention, includes an instruction decoder and a program counter. The instruction decoder decodes fetched instructions and outputs a control signal ordering execution of the fetched instruction. The control signal from the instruction decoder includes a component controlling fetch cycles which triggers a fetch cycle at the beginning of each instruction cycle to fetch the operand for the instruction currently being executed and midway through each instruction cycle to fetch the OP code for the next instruction.

The program counter is responsive to the triggering of each fetch cycle to increment its counter value so as to keep the counter value consistent with the address being accessed in each fetch cycle.

According to one aspect of the invention, a method of operating a microprocessor with a pipe-lined architecture, which allows the instruction data for a later instruction execution cycle to be fetched from memory during a current instruction cycle, comprising the steps of:

preprogramming instruction operation codes (OP codes) for instructions requiring more than 1 byte of instruction data with additional information requesting time-compressed fetching of instruction data; and fetching more than 1 byte of instruction data from memory during the instruction cycle immediately following a request for time-compressed fetch.

The instruction data consists of one OP code byte and one operand byte and the OP code byte is fetched immediately before the onset of an instruction cycle, the fetching step comprising the step of fetching the operand byte associated with the fetched or code byte concurrently with the onset of the instruction cycle. In the alternative, the instruction data consists of one OP code byte and two operand bytes and the OP code byte is fetched immediately before the onset of a first instruction, the fetching step comprising the steps of fetching a first operand byte associated with the fetched OP code byte concurrently with the onset of the first instruction cycle and of fetching a second operand byte associated with the first operand byte during the first instruction cycle following fetching of the first operand byte.

The method further comprising the step of executing the instruction specified by the OP code and operand bytes in the instruction cycle immediately prior to which the OP code byte was fetched.

BRIEF DESCRIPTION OF THE DRAWINGS

The present invention will be understood more fully from the detailed description given herebelow and from the accompanying drawings of the preferred embodiment of the present invention, which, however, should not be taken to limit the invention to the specific embodiment but are for explanation and understanding only.

In the drawings.

DESCRIPTION OF THE PREFERRED EMBODIMENT

Figure 1A:
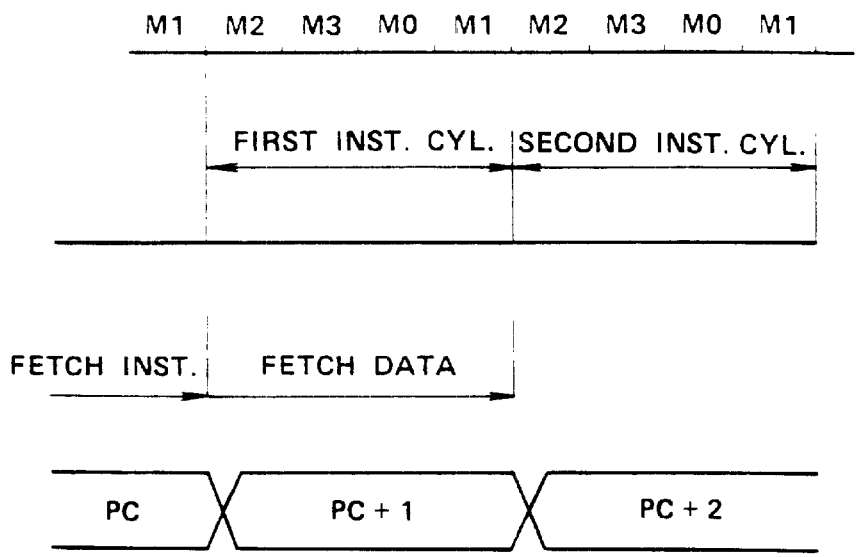
FIGS. 1(A) and 1(B) are timing charts for conventional and inventive instruction cycles for execution of 2-byte instructions.
Figure 1B:
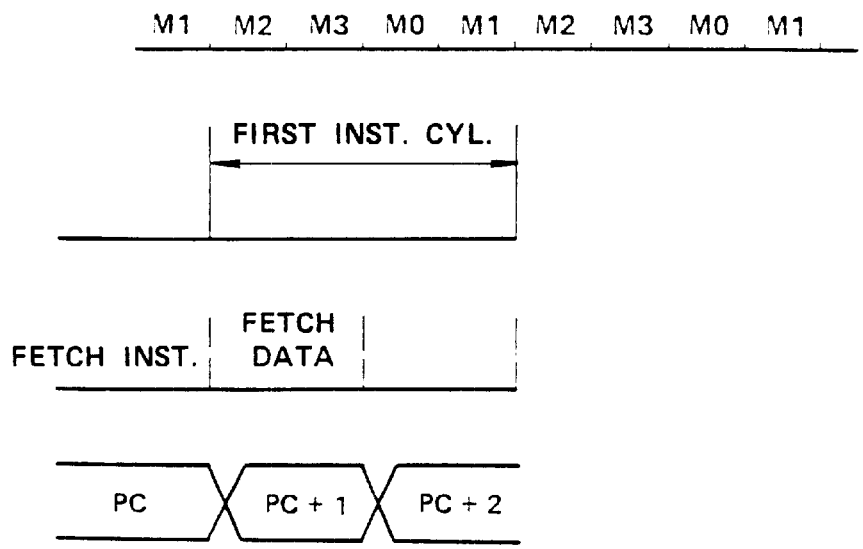

Referring now to the drawings, particularly to FIGS. 1(A) and 1(B), the general and fundamental idea of the preferred process of the present invention will be described in contrast with a conventional process. FIG. 1(A) illustrates a typical process in the prior art and FIG. 1(B) shows the preferred process according to the present invention. Both of the charts are directed to execution of a 2-byte instruction which includes an 8-bit operation code (OP code) such as LDA and an 8-bit operand which in this case is an address code identifying the RAM address to be accessed. In the shown example, the instruction orders the contents of a specific RAM address to be transferred or loaded into the accumulator.

In the conventional process of FIG. 1(A), the OP code LDA for the second instruction cycle is fetched before starting the first instruction cycle. In the next fetch cycle coincident with the onset of the first instruction cycle, data in the RAM address identified by the operand is fetched. The data fetched in the fetch cycle starting concurrently with the first instruction cycle and the OP code LDA fetched before the first instruction cycle are used in the second instruction cycle.

In the conventional process set forth above, a program counter is incremented by one at the end of each instruction cycle. Thefore, at the start of the fetch cycle of the OP code, the program counter value is PC. At the start of the first instruction cycle, the program counter is incremented by 1 and thus the counter value becomes PC+1. Similarly, the program counter is incremented by 1 at the start of the second instruction cycle and thus the counter value becomes PC+2.

In the inventive process of FIG. 1(B), the OP code for the first instruction cycle is fetched before the start of the first instruction cycle as in the above process. This two-byte OP code, however, includes a request to compress the fetch cycle. In the period $M_2$–$M_3$ during the first instruction cycle, data in the RAM address identified by the operand RAM is fetched. The operand data fetched in the period $M_2$–$M_3$ in the first instruction cycle and the OP code fetched before the first instruction cycle are used to execute the first instruction cycle. In this inventive process, the data in the RAM address fetched in the period $M_2$–$M_3$ is not needed for excution of the instruction in the first instruction cycle until the subsequent period $M_0$–$M_1$.

During the process set forth above, the program counter is incremented by one at the end of each instruction cycle. The program counter is also incremented by 1 in response to each $M_3$ clock pulse. In other words, at the end of the fetch cycle for the OP code, the program counter value is incremented from PC to PC+1. In response to the $M_3$ clock in the first instruction cycle, the program counter is incremented by 1 and thus the counter value changes from PC+1 to PC+2. Thereafter, the program counter is again incremented by 1 in response to an $M_1$ clock pulse at the end of the first instruction cycle.

During the period $M_0$–$M_1$ in the first instruction cycle, the OP code for the next instruction cycle can be fetched.

Therefore, as will be appreciated herefrom, only one instruction cycle is needed to execute a 2-byte instruction in the preferred process according to the present invention.

Figure 2A:
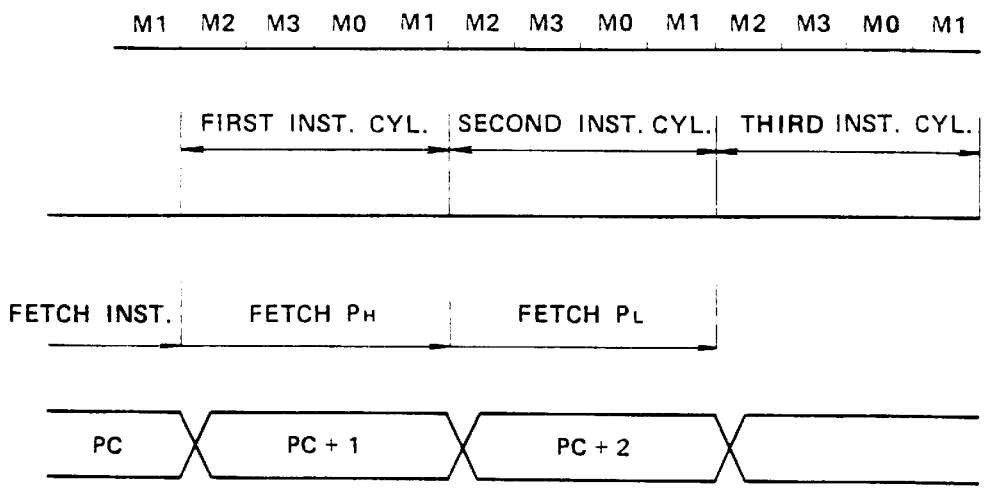
FIGS. 2(A) and 2(B) are timing charts for conventional and inventive instruction cycles for execution of 3-byte instructions.
Figure 2B:
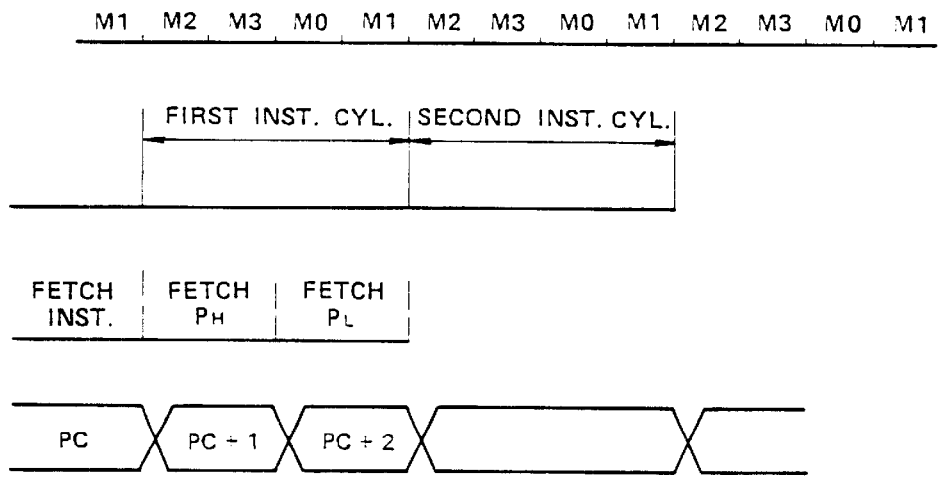

FIGS. 2(A) and 2(B) show another example concerning execution of a 3-byte instruction. The shown example is directed to a subroutine call by which program control jumps to a program address specified by 2 bytes, i.e. a HIGH address byte $P_H$ and a LOW address byte $P_L$. The instruction thus includes a 1-byte (8-bit ) OP code CALL and the two operand bytes $P_H$ and PL In the conventional process of FIG. 2(A), the OP code for the instruction to be executed in the third instruction cycle is fetched before the start of the first instruction cycle. In the next fetch cycle concurrent with the first instruction cycle, the HIGH adress byte $P_H$ is fetched. Similarly, in the second instruction cycle, the LOW address byte $P_L$ is fetched. The HIGH and LOW address bytes$P_H$ and $P_L$ fetched in the fetch cycles concurrent with the first and second instruction cycles and the OP code CALL fetched before the first instruction cycle are used to execute the subroutine call instruction in the third instruction cycle.

During the process set forth above, the program counter is incremented by one at the end of each instruction cycle. Accordingly, at the end of the fetch cycle for the OP code, the program counter value is incremented from PC to PC+1. At the end of the first instruction cycle, the program counter is incremented by 1 and thus the counter value increases from PC+1 to PC+2. Similarly, the program counter is incremented by 1 at the end of the second and third instruction cycles.

In the inventive process of FIG. 2(B), the OP code CALL for the instruction to be executed in the second instruction cycle is fetched before the start of the first instruction cycle. The OP code CALL includes a request to compress the succeeding fetch cycles. During the period $M_2$–$M_3$ in the first instruction cycle, the HIGH address byte $P_H$ is fetched. During the period $M_0$ to $M_1$ in the first instruction cycle, the LOW address byte $P_L$ is fetched. The address bytes $P_H$ and $P_L$ fetched in the first instruction cycle and the OP code CALL fetched before the first instruction cycle are used to execute, the subroutine call in the second instruction cycle.

During the process set forth above, the program counter is incremented by one at the end of each instruction cycle. Also, the program counter is incremented by 1 in response to each $M_3$ clock pulse, which falls halfway through each instruction cycle. At the end of the fetch cycle for the OP code, the program counter value increases from PC to PC+1. In response to the $M_3$ clock in the first instruction cycle, the program counter is again incremented by 1 and thus the counter value becomes PC+2. Thereafter, the program counter is incremented by 1 in response to the $M_1$ clock pulse at the end of the first instruction cycle, and so on.

At the start of the second instruction cycle, the OP code for the next instruction to be executed can be fetched.

Therefore, as will be appreciated herefrom, only two instruction cycles are needed to execute a 3-byte instruction in the preferred process according to the present invention.

Figure 3:
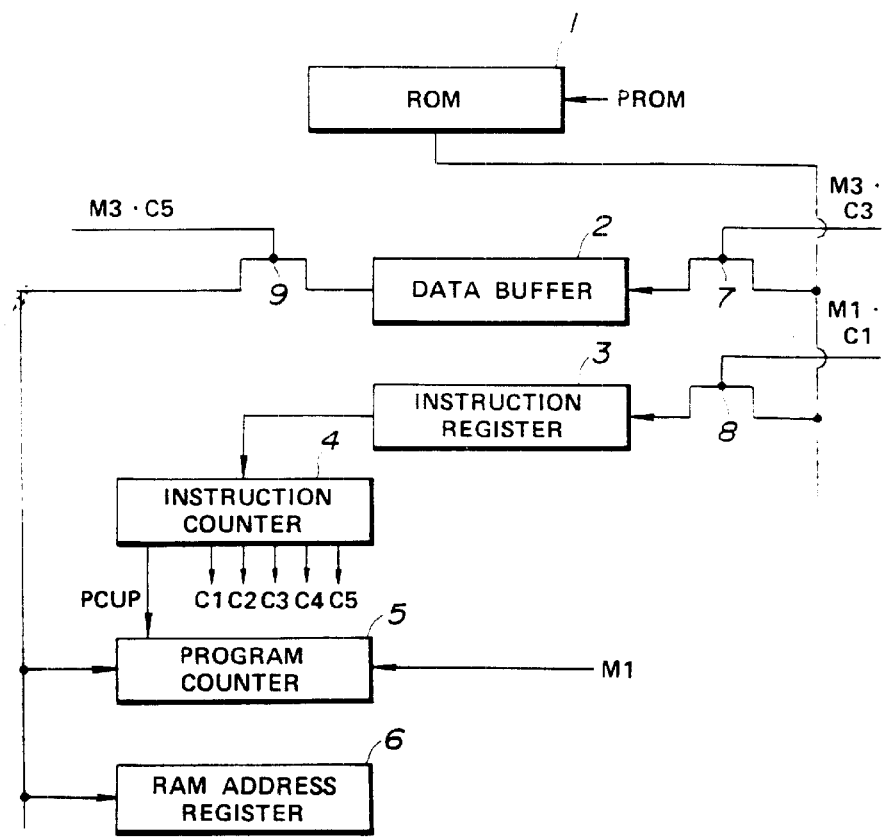
FIG. 3 is a schematic block diagram of a microcomputer system according to the present invention.

FIG. 3 shows a microprocessor system designed to perform the preferred process according to the present invention. The preferred embodiment of a microcomputer comprises a programable ROM (PROM) 1, a data buffer 2, an instruction register 3, an instruction decoder 4 which may be based on a programable logic array (PLA), for example, a program counter 5, a RAM address register 6, and field-effect transistors (FET) 7 to 9.

Figure 4:
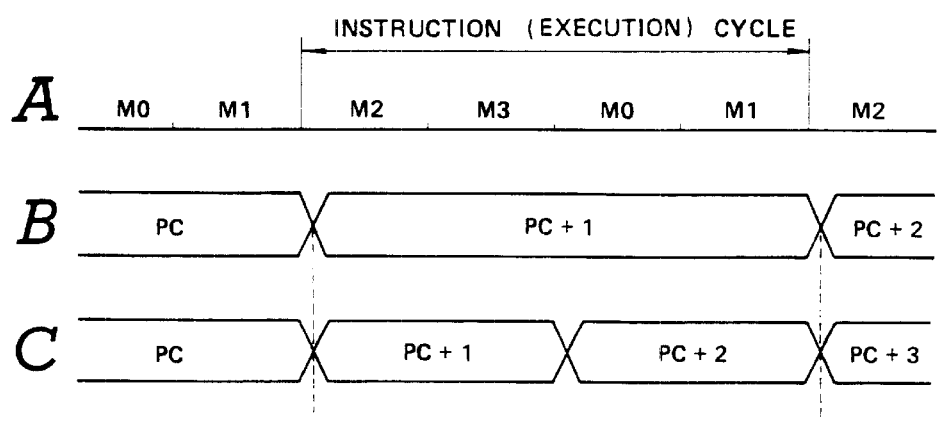
FIG. 4 compares timing charts for conventional and preferred procedures for executing instructions, in which (B) shows the program counter value during execution of 1-byte instructions and (C) shows the same for 2-byte instructions.

Operation of the preferred embodiment of the microcomputer composed as set forth above will be described herebelow with reference to FIG. 4. In FIG. 4, (A) shows clock pulsess $M_2$, $M_3$, $M_0$ and $M_1$ produced during each instruction cycle. (B) shows the program counter value in the program counter 5 during execution of sequential 1-byte instructions. (C) shows variation of the counter value in the program counter 5 during execution of sequential 2-byte instructions.

The instruction decoder outputs a program counter increment signal PCUP and several control signals $C_1$–$C_3$, the latter of which control the flow of information among the microprocessor elements 1–6. The control signals $C_1$, $C_2$ and $C_3$ are ANDed with the clock pulses $M_3$, $M_1$ and $M_3$ again respectively for control of the FETs 7, 8 and 9. FET's 7 and 8 allow data, either operands or OP codes, from the program ROM 1 to be latched by the data buffer 2 or the instruction register 3 when conductive. The FET 9 allows the operand in the data buffer 2 onto the data bus when conductive, whereby the operand can be loaded into the RAM address register 6 for loads, stores or similar commands or into the program counter 5 for subroutine calls, etc.

When an OP code includes a request for time-compressed operand fetch, the instruction decoder 4 outputs both a PCUP pulse and $C_2$ and $C_3$ pulses, which allows the operand to be loaded into and out of the data buffer 2 in response to the next M1-clock pulse and increments the program counter to point to the next OP code.

In the example shown in FIG. 4(B), a 1-byte instruction is executed in a single instruction cycle. Fetching of the instructions in PROM 1 is triggered by the trailing edge of the $M_1$ clock pulse in the presence of the $C_1$ output from the instruction decoder 4. At the same time, the program counter 5 is incremented by 1 in response to the PCUP signal. The fetched instruction (OP code) is read into the instruction register 3 and then fed to the instruction decoder 4. The instruction decoder 4 decodes the fetched instruction and outputs appropriate signals $C_1$, $C_2$, $C_3$.

The trailing edge of the $M_1$ clock signals the start of the instruction cycle in which the instruction fetched in the preceding instruction cycle is executed. Concurrent with execution of the instruction fetched in the preceding cycle, the next 1-byte instruction is fetched during the current instruction cycle. The PROM address to be accessed for the instruction is represented by the counter value (PC, PC+1, PC+2) which is incremented by 1 at every trailing edge of the $M_1$ clock by the PCUP signal.

During execution of 1-byte instructions, since there are no requests for compressed operand fetch, the $C_2$ and $C_3$ outputs of the instruction decoder 4 remain inactive. As a result, the FET's 8 and 9 remain non-conductive. Also, at this time, since the PCUP signal of the instruction decoder 4 is not produced midway through the instruction cycle, the program counter 5 is incremented only in response to the trailing edge of the $M_1$ clock.

As shown in FIG. 4(C), when the 2-byte instructions including a 1-byte OP code and a 1-byte operand are to be executed, the $C_2$ and $C_3$ pulses are output by the instruction decoder 4 after fetching the OP code of the instruction following the trailing edge of the $M_1$ clock. The $C_2$ and $C_3$ outputs render the FET's 8 and 9 conductive to load the operand out of ROM 1 and into the data buffer 2, the program counter 5 and/or the RAM address register 6.

At the trailing edge of the $M_3$ clock, the program counter 5 is incremented by 1 in response to the PCUP signal from the instruction decoder 4. At the same time, for example, the data in the RAM address register 6 is read out and used in the execution of the instruction in the period $M_0$–$M_1$.

During the period $M_0$–$M_1$, the next instruction is fetched from the PROM. In this case, since the program counter 5 is incremented by PCUP in response to the trailing edge of $M_3$ clock, the PROM address represented by the counter value will correspond to the address of the OP code for the next instruction.

As will be appreciated that, in order to enable compression of fetch cycle in according to the preferred procedure as set forth above, it is necessary that the second and/or third bytes of data do not contain OP code components but rather contain only operands such as data or addresses. Since in most 4-bit microcomputers, instructions contain only a 1-byte OP code and one or more opeprand bytes, the preferred procedure as set forth above is applicable to most of this type of microcomputer.

Figure 5:
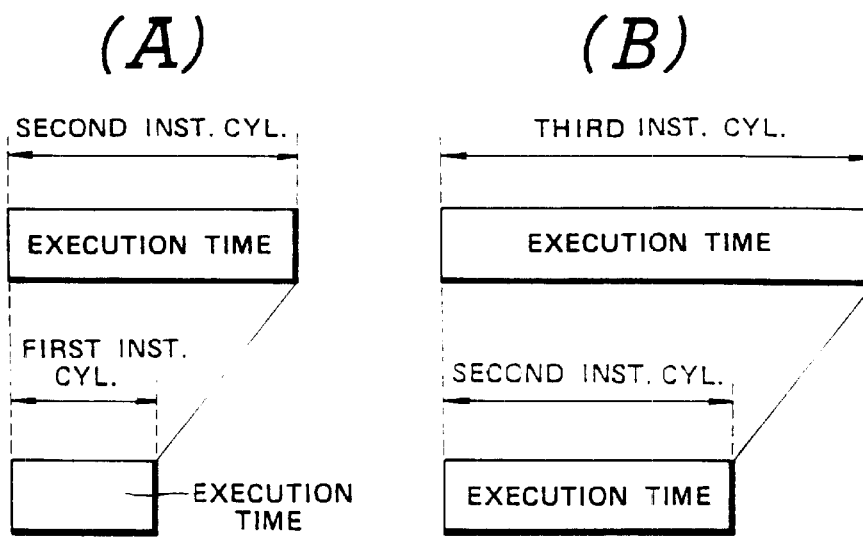
FIGS. 5(A) and 5(B) illustrates the durations of instruction cycles for execution of 2-byte and 3-byte instructions according to the conventional and inventive processes.

As shown in FIGS. 5(A) and 5(B), according to the preferred process according to the invention, 2-byte instructions which conventionally required 2 instruction cycles for execution can be executed in a single instruction cycle in a pipe-line architecture. Similarly, 3-byte instructions which conventionally required 3 instruction cycles for execution can be executed in 2 instruction cycles. Therefore, as easily understood herefrom, the preferred process according to the invention effectively shortens execution time.

Figure 6:
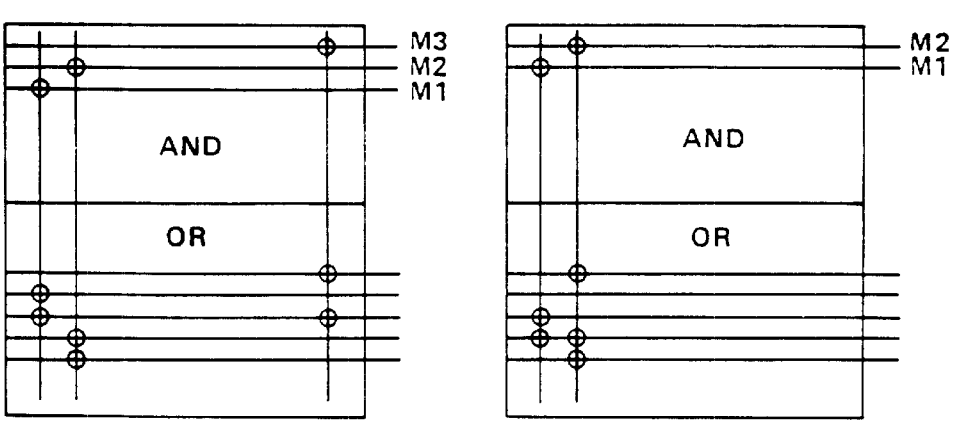
FIGS. 6(A) and 6(B) are illustrations of the conventional and the inventive instruction decoders.

In addition, FIGS. 6(A) and 6(B) diagrammatically illustrate the area required for the instruction decoder in the prior art system and the system according to the invention, and wherein (A) shows a conventional system and (B) shows that according to the present invention. In FIGS. 6(A) and 6(B), the vertical lines represent AND-element selector lines and horizontal lines represents OR-element selector lines. $m_1$ represents machine state 1 selector signal, $m_2$ represents machine state 2 selector input and $m_3$ represents machine state 3 selector input.

As will be appreciated from FIGS. 6(A) and 6(B), in the conventional system, 3 machine states are required to execute a 3-byte instruction requiring 3 instruction cycles. However, according to the preferred process of the present invention, in order to execute 3-byte instructions, only 2 instruction cycles are required. Consequently, only 2 machine states of the instruction decoder are required to execute 3-byte instructions. Therefore, the OR-element selector line which serves as control a signal line for machine state 3 becomes unnecessary. This results in a significant reduction in the length of the AND element selector lines and thus allows a similar reduction of the size of the instruction decoder.

Therefore, the present invention fulfills all of the objects and advantages sought therefor.

While the specific arrangement of the preferred embodiment of the microprocessor has been disclosed hereabove in oder to facilitate full understanding of the invention, the arrangement would be variable in any way depending upon desired operations. Therefore, as will be appreciated that the invention should not be limited to the specific embodiment but include all the possible embodiments and modifications of the embodiments which can be embodied without departing from the principle of the invention set out in the appended claims.

What is claimed is:

1. A method of operating a microprocessor with a pipe-lined architecture, in a manner which allows instruction data for a later, second instruction execution cycle to be fetched from memory during a current, first instruction cycle, comprising the steps of:

preprogramming instruction operation codes (OP codes) for instructions requiring more than 1 byte of instruction data with additional information requesting time-compressed fetching of instruction data; and fetching more than 1 byte of said instruction data from memory during the first instruction cycle immediately following a request for time-compressed fetch.

2. The method of claim 1, wherein said instruction data consists of one OP code byte and one operand byte and said OP code byte is fetched immediately before the onset of an instruction cycle, said fetching step comprising the step of fetching said operand byte associated with said fetched or code byte concurrently with the onset of said instruction cycle.

3. The method of claim 1, wherein said instruction data consists of one OP code byte and two operand bytes and said OP code byte is fetched immediately before the onset of a first instruction, said fetching step comprising the steps of fetching a first operand byte associated with said fetched OP code byte concurrently with the onset of said first instruction cycle and of fetching a second operand byte associated with said first operand byte during said first instruction cycle following fetching of said first operand byte.

4. The method of claim 3, further comprising the step of executing the instruction specified by said OP code and first and second operand bytes in a second instruction cycle immediately following said first instruction cycle.

5. A method of operating a microprocessor with a pipelined architecture, comprising the steps of:

preprogramming instruction operation codes (OP codes) for instructions requiring more than 1 byte of instruction data with additional information requesting time-compressed fetching of instruction data from a memory;

fetching instruction data for a later instruction execution cycle from memory during a current instruction cycle as instructed by said additional information in said OP codes, and fetching more than 1 byte of instruction data from memory during the instruction cycle immediately following a request for time-compressed fetching.

6. A microcomputer comprising:

a read-only-memory storing instruction including an instruction code component and an instruction data component, said instruction code component including instruction for compressing said instruction data component;

an instruction decoder decoding fetched instructions and outputting control signals ordering execution of the fetched instruction, said control signal including a component controlling a fetch cycle which triggers a fetch cycle at the beginning of each instruction cycle to fetch the instruction data for the instruction currently being executed and to fetch said instruction code during one instruction cycle for a next instruction cycle, said instruction decoder being responsive to said instruction for compressing instruction data for performing compressed-fetching of instruction data; and a program counter to be incremented upon every occurrence of triggering the fetch cycle.

* * * * *